United States Patent
Graaf et al.

(10) Patent No.: US 10,252,596 B2
(45) Date of Patent: Apr. 9, 2019

(54) CHILLER INTEGRATION INTO VCOOL SYSTEM

(71) Applicant: Hanon Systems, Daejeon (KR)

(72) Inventors: Marc Graaf, Krefeld (DE); Toni Spies, Köln (DE); Gerald Richter, Aachen (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/200,319

(22) Filed: Jul. 1, 2016

(65) Prior Publication Data

US 2017/0001493 A1    Jan. 5, 2017

(51) Int. Cl.
| | |
|---|---|
| *B60H 1/32* | (2006.01) |
| *H01M 10/625* | (2014.01) |
| *H01M 10/6568* | (2014.01) |
| *H01M 10/6569* | (2014.01) |
| *B60H 1/00* | (2006.01) |

(52) U.S. Cl.
CPC ..... *B60H 1/00278* (2013.01); *B60H 1/00057* (2013.01); *B60H 1/00899* (2013.01); *B60H 1/323* (2013.01); *H01M 10/625* (2015.04); *H01M 10/6569* (2015.04); *B60H 2001/00307* (2013.01); *H01M 10/6568* (2015.04)

(58) Field of Classification Search
CPC .......................... B60H 1/00278; B60H 1/323
See application file for complete search history.

(56) References Cited

U.S. PATENT DOCUMENTS

| | | | | |
|---|---|---|---|---|
| 2013/0298583 A1* | 11/2013 | O'Donnell | ......... | H01M 6/5038 62/115 |
| 2013/0319038 A1* | 12/2013 | Kawase | ............ | B60H 1/00278 62/498 |
| 2014/0075981 A1* | 3/2014 | Uchida | ............. | B60H 1/00278 62/498 |
| 2014/0109613 A1* | 4/2014 | Ohno | ................ | B60H 1/00278 62/498 |

FOREIGN PATENT DOCUMENTS

| | | | | |
|---|---|---|---|---|
| DE | 1408960 C1 | 4/1995 | | |
| DE | 102009028522 A1 | 6/2011 | | |
| DE | 102010042122 A1 | 4/2012 | | |
| DE | 102012100525 A1 | 1/2013 | | |
| DE | 102011052752 A1 | 2/2013 | | |
| DE | 102012108886 A1 | 3/2014 | | |
| DE | 112013003562 T5 | 4/2015 | | |
| DE | 102013021360 A1 | 6/2015 | | |
| EP | 1623857 | * | 2/2006 | .............. B60H 1/00 |
| JP | 2012172917 A | 9/2012 | | |
| JP | 2012243982 A | 12/2012 | | |
| KR | 20150039545 A | 4/2015 | | |

* cited by examiner

*Primary Examiner* — Cassey D Bauer
(74) *Attorney, Agent, or Firm* — Shumaker, Loop & Kendrick, LLP; James D. Miller

(57) ABSTRACT

Vehicle climate control system and method for control of the vehicle climate control system for temperature regulation of a vehicle battery, the vehicle climate control system includes a refrigerant circuit containing at least a compressor, a gas cooler/condenser, an expansion element, an evaporator, as well as refrigerant lines to connect the components, wherein an intermediate expansion element is arranged upstream from the expansion element in the refrigerant flow direction and a heat exchanger for the temperature regulation of a vehicle battery is arranged between the expansion elements.

8 Claims, 2 Drawing Sheets

CHILLER INTEGRATION INTO VCOOL SYSTEM

CROSS-REFERENCE TO RELATED PATENT APPLICATION

Figure 1:
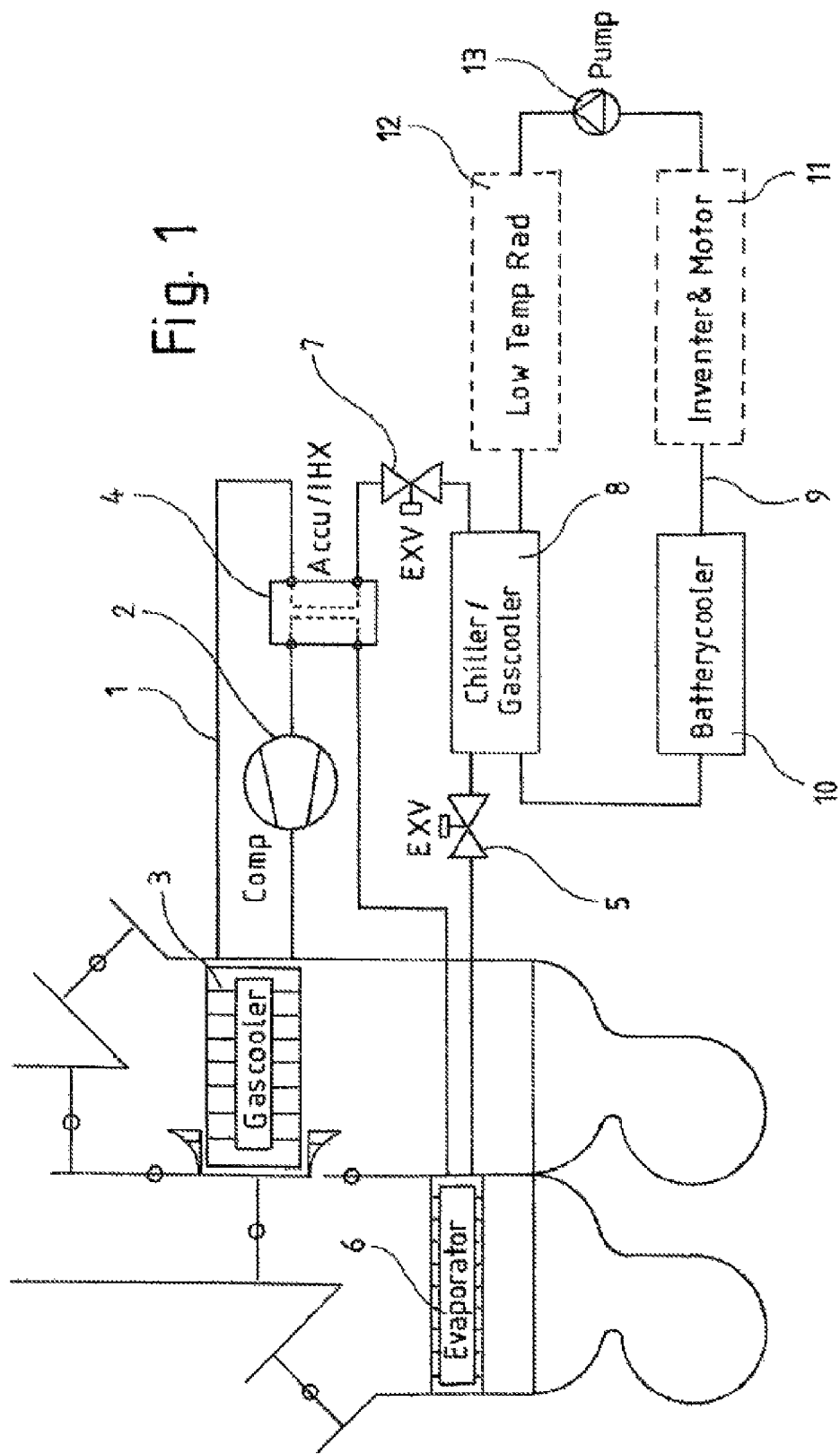

This patent application claims priority to German Patent Application No. DE 10 2015 110 571.3 filed Jul. 1, 2015, the disclosure of which is incorporated herein by reference in its entirety.

FIELD

The invention concerns a vehicle climate control system and method for control of the temperature regulation of a vehicle battery.

BACKGROUND

Vehicle climate control systems, especially very compact designed vehicle climate control systems for climate control of electric and hybrid vehicles, are known in the prior art, for example from DE 10 2009 028 522 A1 and from DE 10 2011 052 752 A1.

With such climate control systems, a climate control of electric and hybrid vehicles has been developed with the goal of heating and cooling the interior space with special consideration of the waste heat put out by the drive system, which is sometimes not enough for the heating of the vehicle interior.

For the cooling of the battery of vehicles, cooling water circuits are used in the prior art, by means of which a heat exchanger, also called a chiller, incorporated in the cooling circuit architecture of the climate control systems of the vehicles.

A motor vehicle refrigerant circuit with a cooling system and heat pump switching is known from DE 10 2012 100 525 A1, wherein a separate refrigerant circuit is provided, in which a heat exchanger is provided for the cooling of the battery.

Electric heating systems are provided in the prior art for the heating of the battery of electric or hybrid vehicles, which either heat the vehicle battery directly by means of a contact heating or indirectly regulate the temperature of a heat transfer agent circuit by an electric heater, in which a heat exchanger is integrated for regulating the temperature of the vehicle battery.

The drawback to the compact climate control systems known in the prior art is that for the most part the climate control of the interior compartment is first and foremost and the important functions for electric and hybrid vehicles such as battery cooling and battery heating can only be realized inadequately, if at all, with the system in the prior art.

The use of a chiller as heat exchanger for the battery cooling, which is operated in parallel with the evaporator of the climate control system, can be implemented in a compact climate control system, but this only realizes the battery cooling and not a battery heating.

SUMMARY

Therefore, the problem to be solved by the invention is to provide a vehicle climate control system with a refrigerant circuit which is additionally able and suitable to regulate the temperature of a vehicle battery. The vehicle climate control system should have the most compact design possible, with few components and the ability to operate the system in an energy-efficient manner.

By a temperature regulation of the vehicle battery in the sense of the invention is meant the optional feasibility of heating and cooling of the vehicle battery.

The problem of the invention is solved by a subject and a method with the features according to the independent patent claims. Modifications are given in the dependent patent claims.

In particular, the problem is solved by a vehicle climate control system in compact design, wherein the refrigerant circuit of the vehicle climate control system has at least the components: compressor, gas cooler/condenser, expansion element, evaporator, as well as refrigerant lines to connect the components. Furthermore, the vehicle climate control system is characterized in that an intermediate expansion element is arranged upstream from the expansion element in the refrigerant flow direction and a heat exchanger for the temperature regulation of a vehicle battery is arranged between the two expansion elements.

Thus, the heat exchanger for the temperature regulation of a vehicle battery is integrated in a series connection in the refrigerant circuit of the climate control system. By means of the intermediate expansion element, the expansion of the refrigerant is done to the corresponding pressure in dependence on the temperature level required by the vehicle battery. Depending on the position of the temperature and pressure level relative to the vehicle battery temperature, the vehicle battery can thus be heated or cooled by the heat exchanger.

Of course, corresponding means are provided for control and regulation of the temperature.

Preferably the vehicle battery is heated or cooled immediately and directly via the heat exchanger of the vehicle battery between the expansion elements of the refrigerant circuit. In this way, a practically heat loss-free temperature regulation of the vehicle battery is possible. Also in this embodiment only especially few components are required for the temperature regulation of the vehicle battery.

Alternatively to the foregoing embodiment, the heat exchanger is arranged on one side in the refrigerant circuit for indirect heating or cooling of the vehicle battery and on the other side in a battery temperature regulation circuit separate from the refrigerant circuit. The heat exchanger designed for the indirect heating or cooling of the vehicle battery can also be called functionally a coupling heat exchanger, since this heat exchanger thermally couples the refrigerant circuit of the vehicle climate control system with the battery temperature regulation circuit. The battery temperature regulation circuit according to this embodiment has a separate battery heat exchanger as well as a pump for circulating the refrigerant fluid and the customary fluid connection lines.

The battery temperature regulation circuit preferably has a low-temperature heat exchanger for the heat transfer. Through this low-temperature heat exchanger, excess heat can be carried away from the battery temperature regulation circuit. This is done either by heat transfer to the surroundings or to other components of the vehicle being heated.

The battery temperature regulation circuit is preferably designed for heating or cooling of the vehicle's driving motor. In this way it becomes possible to couple the various thermally controlled components and areas of the motor vehicle in the sense of an overarching heat and temperature management. The vehicle interior is connected via the refrigerant circuit of the vehicle climate control system to the battery temperature regulation circuit, which in turn thermally couples the vehicle battery and the vehicle driving motor.

The refrigerant circuit preferably has an internal heat exchanger, which is used to improve the efficiency of the refrigerant circuit in dependence on the refrigerant used.

The problem of the invention is furthermore realized by a method for heating or cooling of a vehicle battery with a device as characterized above, wherein the intermediate expansion element adjusts an intermediate pressure in the refrigerant circuit. The intermediate pressure in the refrigerant circuit is controlled in dependence on the required and desired temperature of the vehicle battery. As a result, depending on the pressure and thus the temperature level of the intermediate pressure in the refrigerant circuit of the heat exchanger through which refrigerant is flowing at intermediate pressure, heat is given off to the battery or taken up from the battery and given up to the battery temperature regulation circuit.

Thus, according to the concept, the desired temperature for the vehicle battery is adjusted by controlling the intermediate pressure of the refrigerant circuit of the vehicle climate control system.

Thus, the integration of essential functions of the thermal management for electric and hybrid vehicles in a compact climate control system with realization of the functions of battery cooling and battery heating without an additional electric heating can be done especially advantageously.

The concept of the invention consists in the integration of a heat exchanger for the direct or indirect heating or cooling of the vehicle battery, wherein the heat exchanger is integrated into the refrigerant circuit in a series connection and arranged between two expansion elements. The heat exchanger here is arranged in the flow direction of the refrigerant upstream from the evaporator and between the two expansion valves and thus is operated at a pressure level which can be adjusted from high pressure to low pressure.

The pressure level at the refrigerant side in the heat exchanger can be actively regulated via the expansion valves. Thus, the refrigerant can be regulated by adapting the intermediate pressure to a higher or lower temperature level than the cooling water circuit or the desired battery temperature. As a result, the heat exchanger can be used for battery cooling and battery heating.

Especially advantageously, it should be mentioned that, as compared to known vehicle climate control system architectures, a significantly simplified and compact climate control system is proposed, which can also take on the function of temperature regulation of the vehicle battery. The use of a heat exchanger with dual function of battery cooling and battery heating additionally affords the possibility of utilizing further waste heat which would otherwise be given up to the surroundings via the cooling water.

Thus, the efficiency of the compact climate control system in heating mode, the heat pump mode, can be further boosted substantially.

As a result, costs can be saved, the performance enhanced, and the circulation operated with high efficiency.

DRAWINGS

Figure 2:
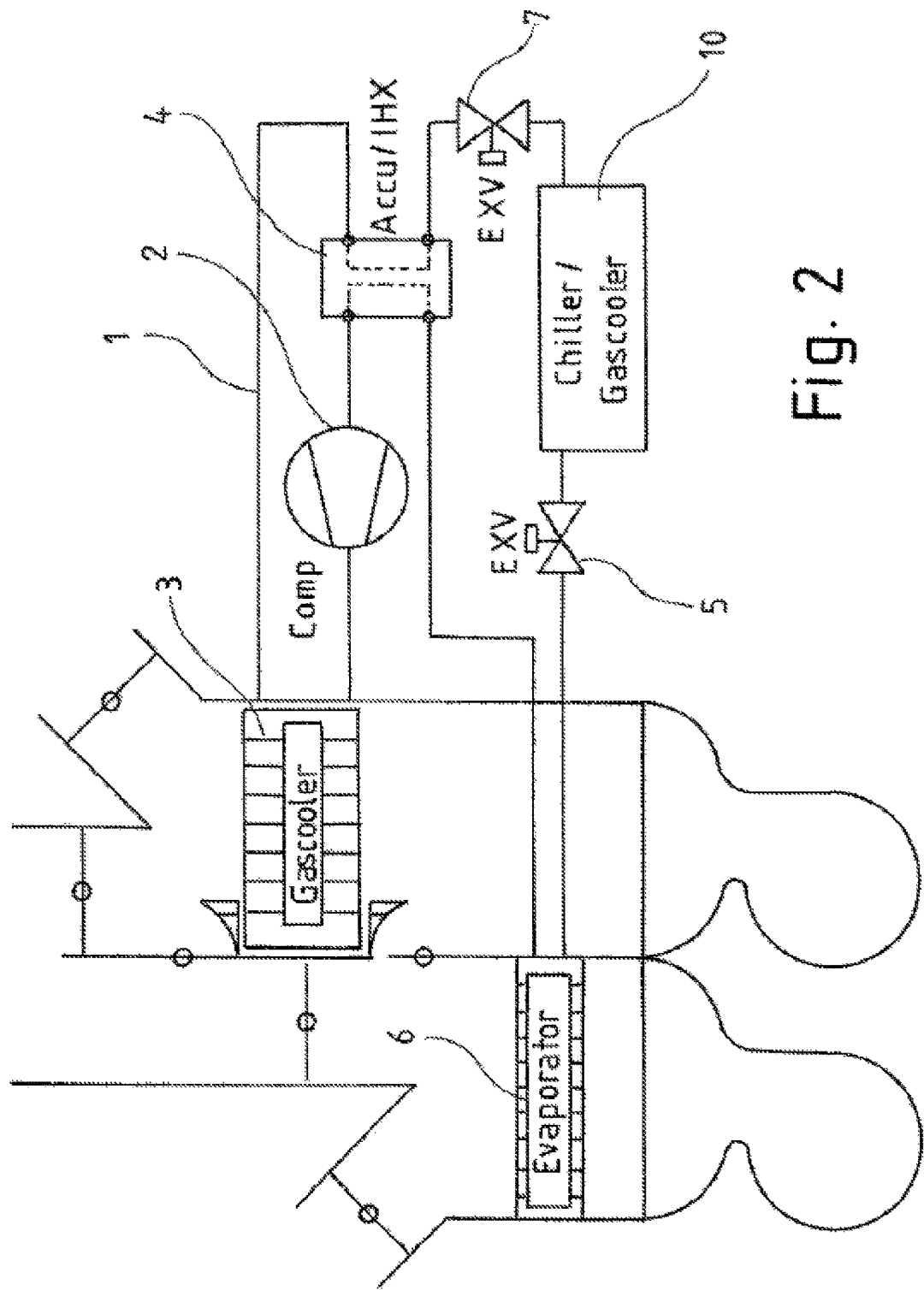

Further details, features and benefits of embodiments of the invention will emerge from the following description of sample embodiments with reference to the corresponding drawings. There are shown:

FIG. 1, a vehicle climate control system with heat exchanger for the indirect temperature regulation of the vehicle battery in a separate battery temperature regulation circuit in compact design of the vehicle climate control system; and FIG. 2, a vehicle climate control system with direct heat exchanger for the temperature regulation of the vehicle battery.

DETAILED DESCRIPTION

FIG. 1 shows a basic diagram of a compact vehicle climate control system. The vehicle climate control system has a refrigerant circuit 1, which contains at least the usual components. In particular, there are provided a compressor 2 as the refrigerant compressor, a gas cooler/condenser 3, an internal heat exchanger 4 as well as an expansion element 5 with the afterwards arranged evaporator 6. The circuit is closed by the usual fluid connection lines and the configuration represented shows a combined storage battery and internal heat exchanger 4, which is provided for suitable refrigerants for superheating of the refrigerant vapor and for supercooling of the condensate with the function of the refrigerant collector in the refrigerant circuit 1.

Furthermore, a second expansion element is provided in the refrigerant circuit 1 as an intermediate expansion element 7, which is arranged upstream from the expansion element 5 and has the function of providing an intermediate pressure level. Between the intermediate expansion element 7 and the expansion element 5, which produces the evaporation pressure level for the evaporator 6, is arranged a heat exchanger 8. This heat exchanger 8 is integrated in a battery temperature regulation circuit 9 on the other side and thus thermally connects the refrigerant circuit 1 to the battery temperature regulation circuit 9. The battery temperature regulation circuit 9 has, besides the heat exchanger 8, its own battery heat exchanger 10, which is in thermal contact with the vehicle battery (not shown), in order to heat or cool the battery depending on the operating situation. The functional designation of indirect heating and indirect cooling of the battery (not shown) by the heat exchanger 8 results from the use of the additional battery heat exchanger 10 or by use of the battery temperature regulation circuit 9.

Furthermore, there is provided in the battery temperature regulation circuit 9 a pump 13 for circulating the heat transfer fluid. Moreover, a low-temperature heat exchanger 12 distinguished by its temperature level is provided for the transfer of heat of the battery temperature regulation circuit 9 to the surroundings or to other suitable heat sinks. The heat management of the vehicle's driving motor 11 can likewise be done via the battery temperature regulation circuit 9, for which the vehicle's driving motor 11 is also thermally integrated in the battery temperature regulation circuit 9.

FIG. 2 shows the refrigerant circuit 1 of the vehicle climate control system similar to FIG. 1. The heat exchanger for the transfer of heat or the uptake of heat from the refrigerant circuit is represented immediately and directly as the battery heat exchanger 10 in this embodiment.

Both embodiments shown per FIG. 1 and FIG. 2 fulfill the function of temperature regulation of the vehicle battery by means of a vehicle climate control system. The incorporating of a heat exchanger for the direct or indirect heating or cooling of the battery in the refrigerant circuit 1 by utilizing an intermediate pressure level thanks to providing a second expansion element and the regulation or control of the intermediate expansion element 7 enables the flexible utilization of the embodiments for the heating or cooling of the vehicle battery. Thus, an efficient temperature regulation of the vehicle battery can be accomplished by means of a vehicle climate control system with few components and an inexpensive control method.

LIST OF REFERENCE SYMBOLS 1 refrigerant circuit
2 compressor
3 gas cooler/condenser
4 internal heat exchanger
5 expansion element
6 evaporator
7 intermediate expansion element
8 heat exchanger
9 battery temperature regulation circuit
10 battery heat exchanger
11 vehicle's driving motor
12 low-temperature heat exchanger
13 pump

What is claimed is:

1. A vehicle climate control system comprising:
   a refrigerant circuit having components including a compressor, a gas cooler/condenser, an expansion element, an evaporator, an internal heat exchanger, and refrigerant lines connecting the components, wherein the internal heat exchanger is arranged directly downstream from the gas cooler/condenser in a refrigerant flow direction;
   an intermediate expansion element arranged upstream from the expansion element in the refrigerant flow direction and directly downstream from the internal heat exchanger in the refrigerant flow direction; and
   a heat exchanger for temperature regulation of a vehicle battery arranged between the expansion element and the intermediate expansion element, wherein the gas cooler/condenser is arranged upstream from the intermediate expansion element in the refrigerant flow direction, wherein the evaporator is arranged downstream from the expansion element in the refrigerant flow direction, wherein the refrigerant is at an intermediate pressure when passing through the heat exchanger, wherein the intermediate expansion element is adjustable in order to adjust the intermediate pressure of the refrigerant when passing through the heat exchanger, wherein an adjustment of the intermediate expansion element is dependent on at least one of a desired temperature of the vehicle battery or a required temperature of the vehicle battery, and wherein the gas cooler/condenser and the evaporator are disposed inside a housing of the vehicle climate control system.

2. The vehicle climate control system according to claim 1, wherein the vehicle battery is directly heated or cooled by the heat exchanger.

3. The vehicle climate control system according to claim 1, wherein the heat exchanger is designed as a heat exchanger in a battery temperature regulation circuit for indirect heating or cooling of the vehicle battery.

4. The vehicle climate control system according to claim 3, wherein the battery temperature regulation circuit has a separate battery heat exchanger and a pump for circulating a heat transfer fluid.

5. The vehicle climate control system according to claim 3, wherein the battery temperature regulation circuit has a low-temperature heat exchanger.

6. The vehicle climate control system according to claim 3, wherein the battery temperature regulation circuit is designed for heating or cooling of a driving motor of the vehicle.

7. A method for heating or cooling of a vehicle battery with a climate control system, the method comprising the steps of:
   providing a refrigerant circuit having components including a compressor, a gas cooler/condenser, an expansion element, an evaporator, an internal heat exchanger, and refrigerant lines connecting the components, wherein the internal heat exchanger is arranged directly downstream from the gas cooler/condenser in a refrigerant flow direction, an intermediate expansion element arranged upstream from the expansion element in the refrigerant flow direction and directly downstream from the internal heat exchanger in the refrigerant flow direction, and a heat exchanger for temperature regulation of a vehicle battery arranged between the expansion element and the intermediate expansion element; and
   adjusting an intermediate pressure in the refrigerant circuit for the heat exchanger by adjusting the intermediate expansion element, wherein the intermediate pressure in the refrigerant circuit is adjusted in dependence on at least one of a required or a desired temperature of the vehicle battery, wherein the gas cooler/condenser is arranged upstream from the intermediate expansion element in the refrigerant flow direction, wherein the evaporator is arranged downstream from the expansion element in the refrigerant flow direction, and wherein the gas cooler/condenser and the evaporator are disposed inside a housing of the vehicle climate control system.

8. The vehicle climate control system according to claim 1, wherein the gas cooler/condenser is arranged directly downstream from the compressor in the refrigerant flow direction, wherein the evaporator is arranged directly downstream from the expansion element in the refrigerant flow direction, wherein the heat exchanger is arranged directly between the expansion element and the intermediate expansion element, and wherein the evaporator is disposed directly upstream from the internal heat exchanger.

* * * * *